United States Patent [19]
Briggs et al.

[11] Patent Number: 5,748,410
[45] Date of Patent: May 5, 1998

[54] SLOTTED FLEX CIRCUIT FOR A DISK DRIVE ACTUATOR

[75] Inventors: John C. Briggs, Layton; Robert S. Patterson; Jason Dewey, both of Ogden, all of Utah

[73] Assignee: Iomega Corporation, Roy, Utah

[21] Appl. No.: 749,999

[22] Filed: Nov. 15, 1996

[51] Int. Cl.$^6$ .................... G11B 5/55; G11B 21/08
[52] U.S. Cl. .................................................. 360/106
[58] Field of Search ........................... 360/106, 104; 174/68.1, 117 F, 117 FF, 250, 251, 253

[56] References Cited

U.S. PATENT DOCUMENTS

| | | | |
|---|---|---|---|
| 4,811,143 | 3/1989 | Ohashi et al. | 360/104 |
| 4,812,934 | 3/1989 | Suzuki et al. | 360/104 |
| 4,819,108 | 4/1989 | Seki et al. | 360/104 |
| 4,823,217 | 4/1989 | Kato et al. | 360/104 |
| 4,835,642 | 5/1989 | Furukawa et al. | 360/104 |
| 5,166,846 | 11/1992 | Shigemoto | 360/104 |
| 5,305,167 | 4/1994 | Nagase et al. | 360/104 |

*Primary Examiner*—Robert S. Tupper
*Attorney, Agent, or Firm*—Woodcock Washburn Kurtz Mackiewicz & Norris LLP

[57] ABSTRACT

A voice coil actuator return path and a slotted flex circuit member for a linear actuator of a disk drive, which together accurately and precisely position the center guide track, and align the mass and forces of the electrical circuit on the carriage are disclosed. The outer return path is precisely formed from laminations of low carbon steel. The outer return path supports and accurately positions a central guide track, on which a carriage assembly slides. Moreover, the outer return path is oriented in a rectangle that is coupled to a disk drive platform, and includes an aperture through which a portion of the carriage assembly passes.

A flex circuit member, which electrically communicates with the read/write heads, includes a slot that enables the central guide track to pass though. The slot enables the flex circuit member to be connected to the carriage assembly near a center axis of the carriage. The flex circuit member has a center of mass and center of force approximately equally distributed on each side of a vertical plane passing through a centerline of the central guide track.

17 Claims, 4 Drawing Sheets

5,748,410

SLOTTED FLEX CIRCUIT FOR A DISK DRIVE ACTUATOR

BACKGROUND OF THE INVENTION

1. Field of the Invention

The present invention relates to data storage devices, or disk drives, for storing digital information, and more particularly, to a slotted flex circuit member and outer return path for a voice coil actuator of a disk drive.

2. Description of the Prior Art

Disk drives often employ linear actuators for positioning read/write heads of the disk drive over the surfaces of a disk-shaped storage media. Linear actuators, for example a voice coil actuator, have been used to carry the heads for magnetic disk drives, CD players, and optical drive devices. Magnetic flux for the linear actuator is typically generated by a magnetic circuit comprising a return path assembly and a pair of magnets.

The return path assembly is traditionally comprised of a top plate, a bottom plate, and a plurality of standoffs. The standoffs hold the separate top and bottom plates apart at a predetermined distance to form an air gap for receiving a coil coupled to one end of the carriage.

The magnets are typically bonded to the inner walls of both the top and bottom plates. The top and bottom plates, along with the standoffs, form a flux return path for a magnetic field generated by the top and bottom magnets. The magnetic flux within the air gap between the magnets induces a force on the actuator in response to an electric current in the actuator coil. Typically, a flex circuit attached to the carriage assembly supplies current to the coil and carries signals between the heads and an interface board.

A frequent problem in actuator operation is that the signals carried to and from the read/write heads are subject to noise from the actuator coil. One method of reducing such noise is to arranged the flex circuit perpendicular to the coil wires.

Co-pending application Ser. No. 08/727,128 filed Oct. 18, 1996 entitled, "Actuator For Data Storage Device", incorporated herein by reference in its entirety, describes a linear actuator comprising a central guide track on which bushings within the carriage assembly ride. Each of the bushings, actuator arm assemblies, and coil are spaced substantially symmetrically about the central guide track. Such symmetrical spacing is an advantage because it aligns the carriage center of mass and center of force along the central guide track. Such alignment minimizes friction and avoids binding forces and resonance problems.

Although the central guide track linearly directs the actuator, the actuator remains unrestrained from rotating axially around the central guide track. Such rotation may cause imprecise positioning of the heads. Often, linear actuators are supplied with two parallel guide tracks in order to eliminate such rotation, but this solution is expensive. Inexpensively minimizing the rotation of a linear actuator having only a central guide track is desirable.

Further regarding accurate positioning of the heads, the central guide track should be accurately positioned within the actuator. Disk drives are typically crowded in the area of the linear actuator, thus making support of the central guide track problematic.

Although the central guide track design provides the advantages described herein and in application Ser. No. 08/727,128 filed Oct. 8, 1996, its location creates new problems. The central guide track location is problematic because it passes through the area at the back end of the carriage assembly. A conventional flex circuit ribbon cannot be symmetrically connected to the back end of the carriage at the carriage centerline because that area is obstructed by the central guide track. Therefore, the flex circuit ribbon traditionally is attached to the side of the coil, far from the centerline of the carriage.

Because of the side attachment, the flex circuit traditionally requires additional clear space along the side of the actuator, through which the flex circuit sweeps during actuator movement.

Moreover, attachment of the flex circuit to the side of the coil imparts a force on the carriage assembly, which diminishes the advantages of the symmetrical spacing of the other carriage assembly components, specifically the actuator arm assemblies, the coil, and the bushings. The force imparted by the flex circuit tends to bind the carriage assembly and may lead to imprecise and inaccurate head control, premature bushing and central guide track wear and distortion that further exacerbates poor head control, and resonance problems during carriage actuation.

There is a need, therefore, for a return path that accurately positions and supports the central guide track and that prevents carriage rotation around the axis of the central guide track. Relatedly, to overcome the disadvantages of asymmetry on the carriage assembly, there is a need for a flex circuit device that is substantially symmetrical with the central guide track, that allows leads carrying signals from the heads to pass perpendicular to the coil, and that fits within the outer return path. The present invention satisfies this need.

SUMMARY OF THE INVENTION

The present invention is directed to a magnetic return path and a slotted flex circuit member for a linear actuator of a disk drive that accurately and precisely position the center guide track, align the mass and forces of the flex circuit on the carriage, arrange the flex circuit perpendicular to the coil wires, and minimize carriage rotation. An outer return path supports and accurately positions a central guide track, on which a carriage assembly slides. Inner return path members, which is supported by the outer return path, prevents rotation of the carriage during actuation. The outer return path forms approximately a horizontal rectangle and includes a cut-out portion through which a portion of the carriage assembly passes.

A flex circuit member, which electrically communicates with the read/write heads, includes a slot that enables the central guide track to pass though. The slot enables the flex circuit member to be connected to the carriage assembly near a center axis of the carriage. The flex circuit member has a center of mass approximately equally distributed on each side of a vertical plane passing through a centerline of the central guide track. Also, the flex circuit assembly minimizes the space required by occupying the same space swept by the carriage during movement from the retracted position to the fully engaged position. The flex circuit member is oriented such that the leads carrying signals to and from the heads are perpendicular to the wires of the coil.

The foregoing and other objects, features and advantages of the invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENTS

Figure 1:
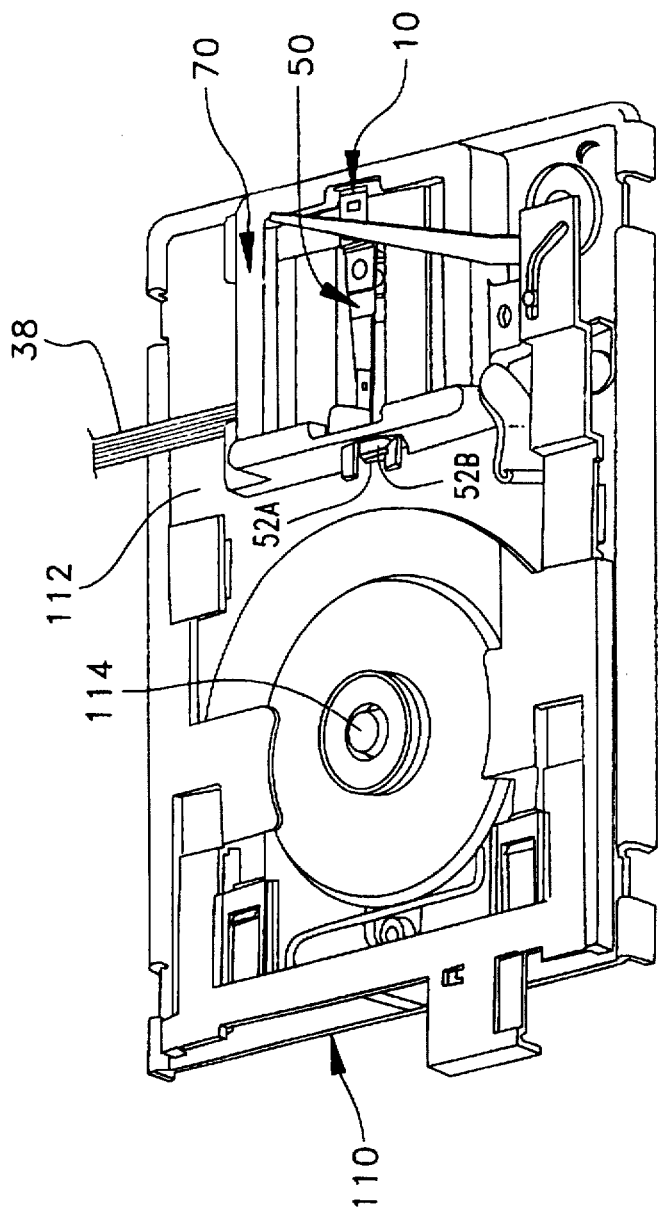
FIG. 1 shows an exemplary disk drive in which the flex circuit member and the return path of the present invention may be employed.

Referring to the drawings wherein like numerals indicate like elements throughout, there is shown in FIG. 1 an exemplary disk drive 110 in which the present invention may be employed. The exemplary disk drive 110 is of the type the receives a removable disk cartridge, however, the present invention is by no means limited thereto. For example, the present invention can also be employed in a fixed-disk type drive.

As shown in FIG. 1, the exemplary disk drive 110 comprises a platform 112 on which a number of disk drive components are mounted. A spindle motor 114 is mounted on the platform 112 to provide a means for rotating a storage medium within a disk cartridge. Also, a voice coil actuator 70 is mounted on the platform 112. The magnetic motor 70 drives a carriage assembly 50 of a linear actuator from a retracted position, shown in FIG. 1, into operational positions in which read/write heads 52A and 52B engage a recording medium. The voice coil actuator 70 also drives the carriage assembly 50 from the operational positions into the retracted position, wherein the heads 52A and 52B are parked. A flex circuit member 10, according with the present invention, is electrically coupled between the heads 52A and 52B and a computer interface 120, shown diagrammatically in FIG. 4.

Figure 2:
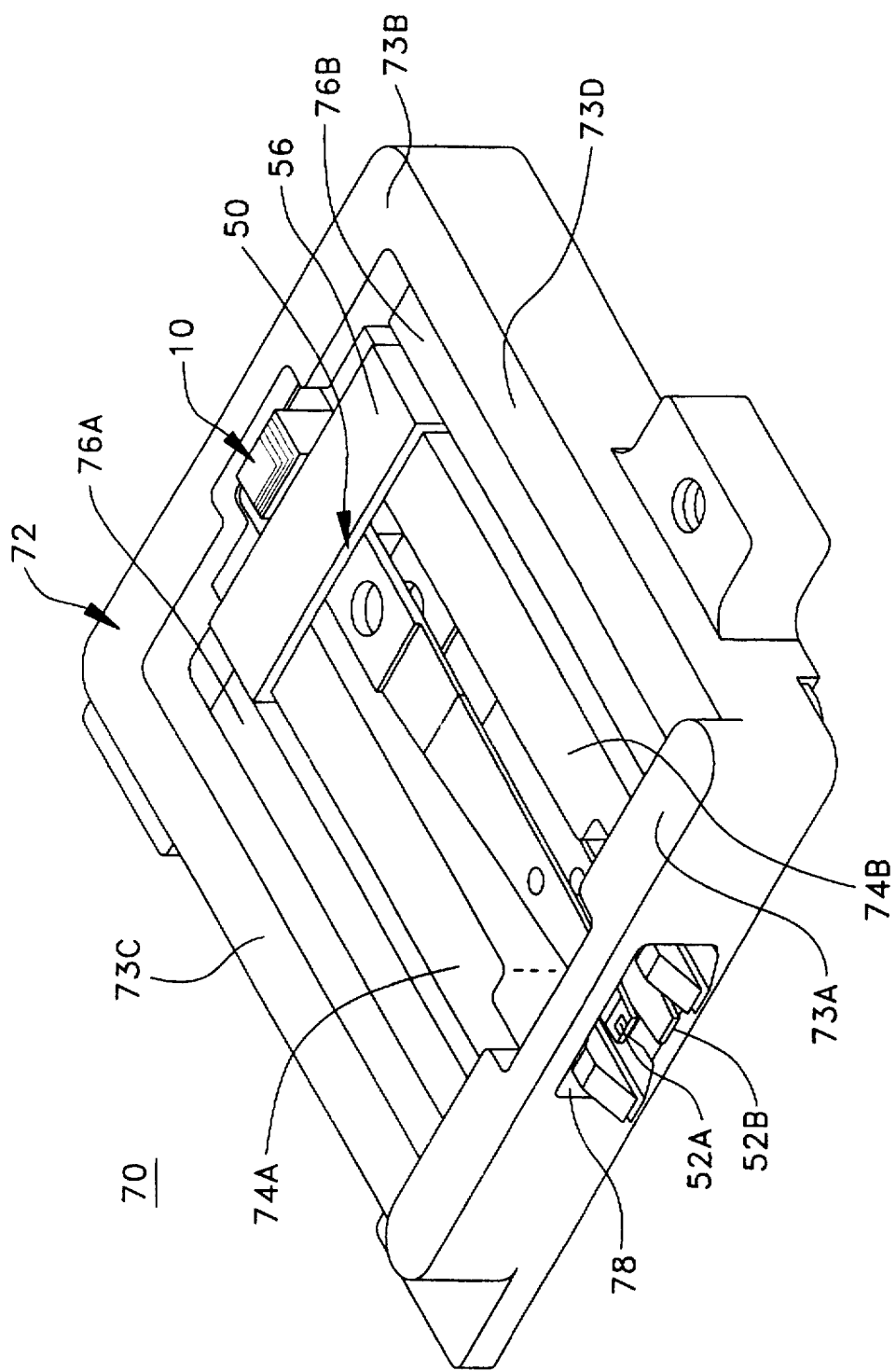
FIG. 2 shows a view of the coil and the carriage assembly according to the present invention.

As shown in FIG. 2, according with the present invention, the voice coil actuator 70 has an outer return path 72, two inner return path members 74A and 74B, and two magnets 76A and 76B. The outer return path 72 includes a front member 73A, a rear member 73B, and two side members 73C and 73D. Each end of the front member 73A is coupled to one end of each of the side members 73C and 73D. An other end of the side member 73C is coupled to one end of the rear member 73B. Likewise, an other end of the side member 73D is coupled to an other end of the rear member 73B. In the preferred embodiment, the connecting members are mutually perpendicular such that the outer return path 72 defines a rectangle oriented substantially parallel to the platform 112. The outer return path is disposed around at least a portion of the carriage assembly 50. The outer return path 72 is attached to the disk drive platform 112 by conventional means.

The side members 73C and 73D of outer return path 72 support the inner return path members 74A and 74B. Each of the inner return path members 74A and 74B is coupled on one end to the front member 73A and on another end to the rear member 73B of the outer return path 72. Each of the inner return path members 72A and 72B pass through an opening in the coil 56 in such a manner as to prevent the carriage assembly 50 from rotating around the central guide track axis 40. The magnets 76A and 76B are attached to the outer return path by conventional methods, for example by adhesives, and are disposed along each side of the carriage assembly 50.

According to the present invention, the front member 73A includes an aperture 78 for enabling the heads 52A and 52B and at least portion of the actuator arm assemblies 54A and 54B to pass therethrough. A beam 80, shown in FIG. 3, substantially horizontally spans the aperture 78. The beam 80 is disposed near a horizontal centerline of the aperture 78 such that one actuator arm assembly 54A is disposed above the beam 80 and an other actuator arm assembly 54B is disposed below the beam 80. Each end of the beam 80 is rigidly coupled to the front member 73A. The beam 80 is coupled to and supports one end of the central guide track 53 near a vertical centerline of the aperture 78. The rear member is coupled to and supports an other end of the central guide track 53.

The central guide track 53 should be positioned properly both horizontally and vertically in order to adequately guide the carriage assembly. To provide for this proper positioning, in the preferred embodiment the outer return path 72 is formed by stacking a plurality of laminations of magnetically permeable material, preferably a low carbon steel. Forming the return path as a single piece by such laminations enables manufacturing and assembly tolerances to be tightly controlled. By this method of manufacturing the outer return path 72, precise and accurate positioning of the aperture 78 and beam 80, and ultimately the central guide track 53, is achieved.

Figure 3:
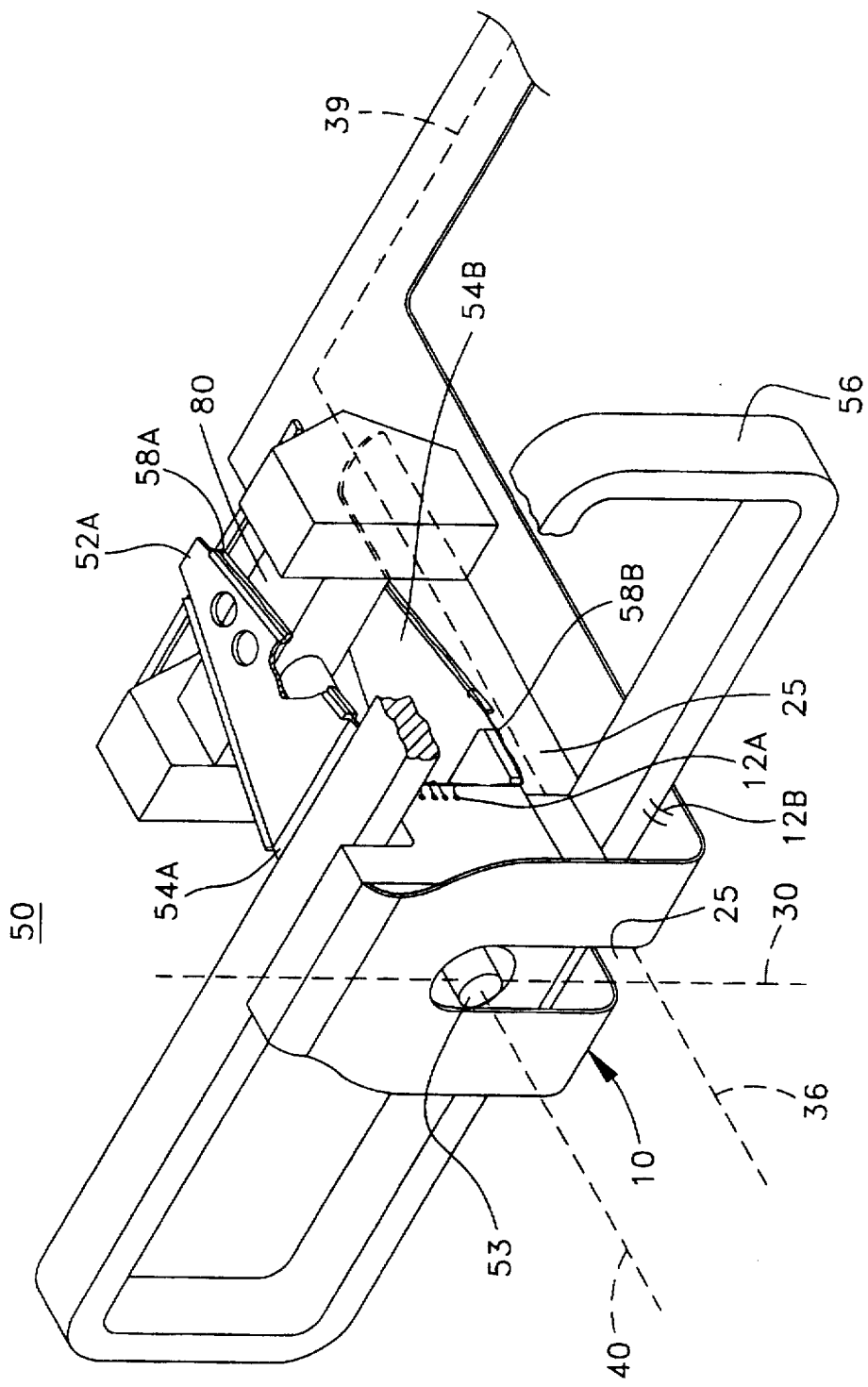
FIG. 3 is view of the carriage assembly removed from FIG. 1 and FIG. 2, showing the flex circuit member of the present invention (for clarity the leads of the flex circuit member have been omitted from FIG. 3); and, FIG. 4 is a view of the flex circuit member of the present invention removed from FIG. 3.

As shown in FIG. 3, according with the present invention, the carriage assembly 50 includes two read/write heads 52A and 52B, two actuator arms 54A and 54B, a coil 56, the central guide track 53, head wires 58A and 58B, and a flex circuit member 10. The central guide track 53 defines a center axis 40 at the center line of the central guide track 53. In the preferred embodiment, flex circuit member 10 comprises a conventional flex circuit ribbon having a plurality of leads within a substrate.

The carriage assembly 50 linearly slides on the central guide track 53 on bushings that are rigidly mounted in the carriage assembly. In the preferred embodiment, the central guide track is either a wire or a rod. The carriage assembly includes bushings that slide along either the wire or the rod.

The actuator arm assemblies 54A and 54B are coupled to the coil 56. In the preferred embodiment, one head is coupled to each one of the actuator arm assemblies 54A and 54B at its front end (that is, the end of the carriage nearest the magnetic medium). The head wires 58A and 58B electrically couple the heads 52A and 52B to the flex circuit 10 at connection pads 12A. The connection pads 12A are disposed on the carriage assembly 50 near its back end (that is, the of the carriage assembly farthest from the heads 52A and 52B). One set of a plurality of head wires 58A run from one head 52A, along one actuator arm assembly 54A, and to the flex circuit 10. An other set of a plurality of head wires 58B run from another head 52B, along another actuator arm assembly 54B, and to the flex circuit 10.

As shown in FIG. 3, the flex circuit member 10 is coupled to the back end of the carriage assembly 50 (that is, the end of the carriage assembly farthest from the heads 52A and 52B). The flex circuit member 10 is electrically coupled to head wires 58A and 58B at the connection pads 12A and enables electrical communication between the head wires 58A and 58B and the computer interface 120. The flex circuit 10 also comprises leads for supplying current to the coil 56 at connection pads 12B.

Figure 4:
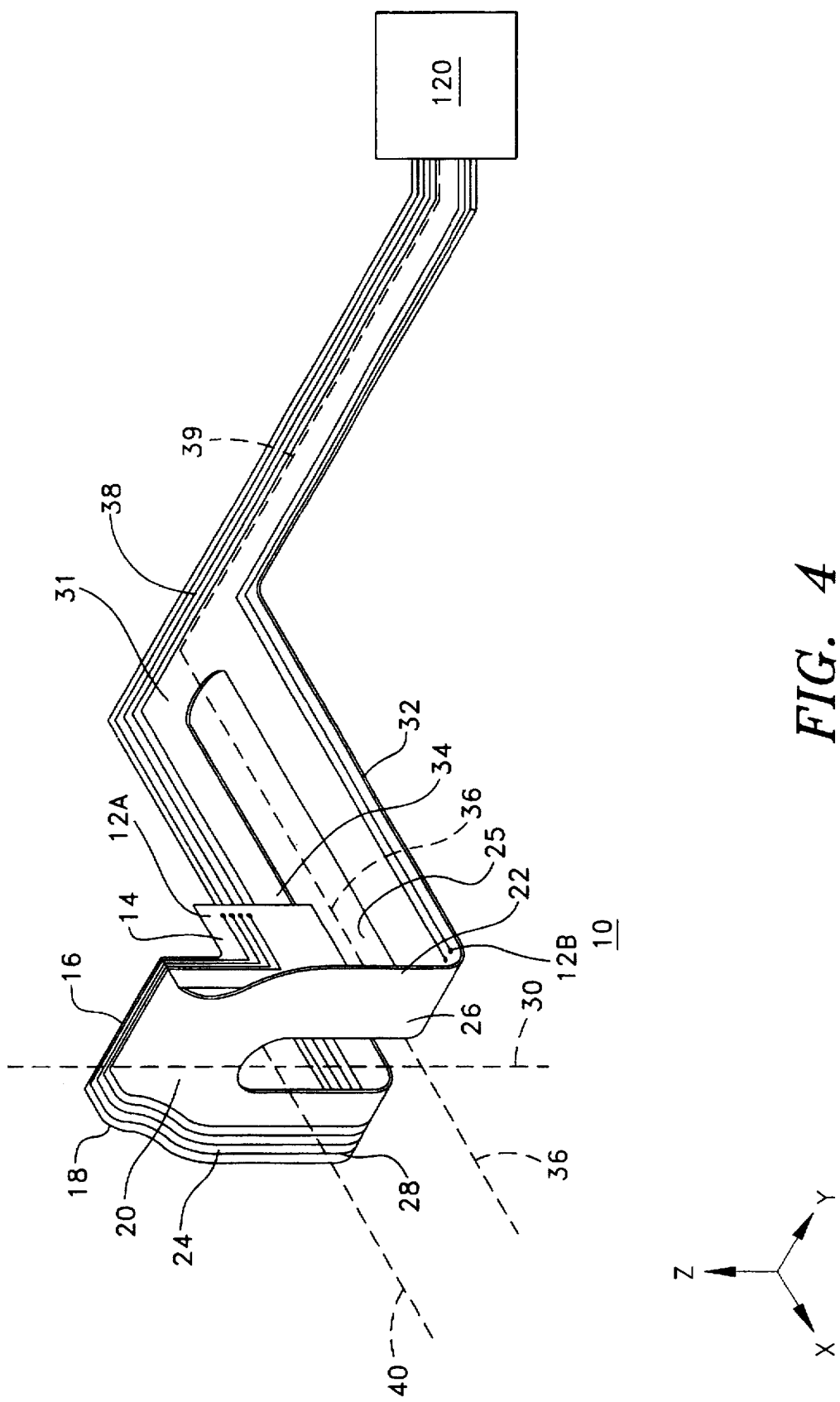

As shown in FIG. 4, the flex circuit member 10 includes the connection pads 12A and 12B, a first member 14, a second member 16, a forked vertical member 20, a forked horizontal member 31, and a transverse member 38. The vertical member 16 and the horizontal member 31 include a first vertical furcation 22, a second vertical furcation 24, a first horizontal furcation 32, and a second horizontal furcation 34, respectively. According to the present invention, the furcations define a slot 25, which has a vertical slot center line 30 and a horizontal slot center line 36. The transverse portion 38 has a transverse portion center line 39. In the preferred embodiment, the leads for carrying signals to and from the read/write heads 52A and 52B are disposed on one of side of the slot 25 and the leads for carrying current to the coil 56 are disposed on an other side of the slot 25. The connection pads 12A is located on the first member 14 and the connection pads 12B are located on the horizontal member 31.

The slot 25 substantially evenly divides the furcations 22 and 24, and the furcations 32 and 34, along each side of the center axis 40. The slot 25 enables the central guide track 53 to pass through the flex circuit member 10, thereby enabling mass and force of the flex circuit member 10 to be substantially equally distributed on each side of a vertical plane passing through the center axis 40.

The first member 14 is rigidly coupled to the carriage assembly 50 and defines a plane oriented substantially vertically such that its normal vector is substantially perpendicular to the center axis 40. The second member 16 is rigidly coupled to the carriage assembly 50 and defines a plane oriented substantially horizontally such that its normal vector is substantially perpendicular to the center axis 40. The connection of the first member 14 with the second member 16 defines a corner.

The second member 16 is connected to a solid end of the vertical member 20 near the top of the carriage assembly 50 as the end opposite the heads 52A and 52B. The connection of the second member 16 and the vertical member 20 defines a first radius 18. The vertical member 20 splits into a first vertical furcation 22 and a second vertical furcation 24, which defines the slot 25. A vertical slot center line 30 is substantially perpendicular and co-planer with the center axis 40.

The first vertical furcation 22 and the second vertical furcation 24 are connected with the first horizontal furcation 32 and the second horizontal furcation 34, respectively. The connection of the first furcations define a first furcation radius 26. The connection of the second furcations define a second furcation radius 28. The horizontal furcations 32 and 34 define the horizontal portion of the slot 25, which has a horizontal slot center line 36. The horizontal slot center line 36 is substantially parallel and substantially co-planer with the center axis 40. Because the wires of the coil 56 are perpendicular to the center axis 40, the leads within the vertical member 20 and the horizontal furcations 32 and 34 are substantially perpendicular with wires of the coil 56. The perpendicular arrangement reduces noise picked up by the flex circuit 10 from the coil 56, which results in clearer signals transmitted to and from the read/write heads 52A and 52B.

The horizontal furcations 32 and 34 join at the distal end of the flex circuit member 10 forming a solid end of the horizontal member 31. The horizontal member 31 of the flex circuit member 10 is disposed beneath the actuator arms 54A and 54B when the carriage assembly 50 is in the retracted position.

A transverse portion 38 has one end coupled with the horizonal member 31 and an other end coupled to the computer interface 120. The transverse portion 38 has a transverse portion center line 39 which is substantially perpendicular and co-planer with the horizontal slot center line 36. In the preferred embodiment, the computer interface 120 includes a preamplifier and a printed circuit board for enabling communication between the read/write heads and other computer hardware components.

FIG. 3 and FIG. 4, for convenience, show the flex circuit member 10 in a position corresponding to the carriage assembly 50 in the retracted position. When the linear actuator is called upon to engage the heads 52A and 52B with a magnetic medium, the voice coil actuator 70 urges the carriage assembly 50 forward from the retracted position along the central guide track 53. The actuator arm assemblies 54A and 54B of the carriage assembly 50 carry the heads 52A and 52B into the engaged positions. The carriage assembly 50 also carries forward the flex circuit member 10, because the first member 14 and second member 16 are coupled to the carriage assembly 50.

As the carriage assembly 50 urges further forward, the vertical member 20 and the horizontal member 31 amorphously bend, thus maintaining the electrical communication. As the carriage assembly 50 begins to move forward from the retracted position, the furcations 22 and 24 pass by the central guide track 53, which remains stationary. As the carriage assembly 50 urges further forward, the furcations 26 and 28 pass by the central guide axis 53. In this way, the slot 25 enables the central guide axis 53 to pass through the flex circuit member 10, thus enabling the flex circuit member 10 to have mass and force substantially equally distributed on each side of a plane defined by the center axis 40, the vertical slot centerline 30, and the horizontal slot centerline 36. Having the carriage assembly with a center of mass and center of force aligned along the center line of the guide track 53 is advantageous because it minimizes friction, avoids binding forces, decreases vibration, and minimizes wear.

As the foregoing illustrates, the present invention is directed to a return path and to a flex circuit member, which together accurately and precisely position the center guide track, align the mass and forces of the electrical circuit on the carriage, minimize space required, and reduce noise to the head signals caused by the coil. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A linear actuator for carrying read/write heads of a disk drive into engagement with a recording medium, the linear actuator comprising:

(a) a carriage assembly having at least one actuator arm being mounted to at least one of the read/write heads;

(b) an outer return path magnetically coupled to the carriage assembly for driving the carriage assembly between an operational position and a retracted position;

(c) a central guide track disposed within the outer return path, the central guide track defining a center axis that is collinear with a central guide track centerline, the carriage assembly being linearly moveable along the guide track; and, (d) a flex circuit member having one end electrically coupled to at least one of the read/write heads and an other end electrically coupled to a computer interface, the flex circuit member having a slot for passing the central guide track therethrough, and wherein the flex circuit member has mass distributed substantially equally on each side of a vertical plane being coincident with the center axis of the central guide track.

2. The linear actuator of claim 1 wherein the flex circuit member comprises a flex circuit ribbon.

3. The linear actuator of claim 1 wherein the flex circuit comprises a plurality of leads within a substrate.

4. The linear actuator of claim 1 further comprising a plurality of head wires, at least one of the head wires having an end coupled to at least one of the read/write heads of the carriage assembly and an other end coupled to the flex circuit.

5. The linear actuator of claim 4 wherein the flex circuit member comprises:

(a) a first planar member coupled to the carriage assembly, the first member oriented substantially vertically and having a normal vector approximately perpendicular to the center axis;

(b) a second planar member coupled to the carriage assembly and to the first member, the second member oriented substantially horizontally and having a normal vector approximately perpendicular to the center axis;

(c) a flexible, planar vertical member comprising:
 (i) a solid vertical end coupled to the second member, thereby defining a first radius;
 (ii) a forked vertical end comprising a first vertical furcation and a second vertical furcation, the first and second vertical furcations being spaced apart and defining a vertical portion of the slot therebetween, the vertical portion of the slot defining a vertical slot centerline, the vertical slot centerline bisecting the center axis and being substantially perpendicular therewith;

(d) a flexible, planar horizontal member comprising:
 (i) a forked horizontal end comprising:
  a first horizontal furcation coupled to the first vertical furcation, thereby forming a first furcation radius; and, a second horizontal furcation coupled to the second vertical furcation, thereby forming a second furcation radius;
  the first and second horizontal furcations being spaced apart and defining a horizontal portion of the slot therebetween, the horizontal portion of the slot defining a horizontal slot centerline, the horizontal slot centerline being substantially parallel and substantially co-planar with the center axis; and,
 (ii) a solid end including a transverse portion that is co-planar with the horizontal furcations, and defining a transverse centerline that is substantially co-planar and substantially perpendicular with the horizontal slot axis.

6. The linear actuator of claim 5 wherein the horizontal member is disposed beneath the carriage assembly and is oriented horizontally while the carriage assembly is located in the retracted position.

7. The linear actuator of claim 1 wherein the voice coil actuator further comprises an outer return path assembly being formed from a magnetically permeable material, each one of the two ends of the central guide track being connected to the outer magnetic return path.

8. The linear actuator of claim 7 wherein the outer magnetic return path further comprises:

(a) two side members;

(c) a front member having an aperture for enabling the read/write heads to pass therethrough; and, (d) a rear member;

each one of the side members being coupled with each one of the front member and the rear member; one end of the central guide track being coupled to the front member, and an other end of the central guide track being coupled to the rear member.

9. The linear actuator of claim 8 wherein each one of the ends of the front member is substantially perpendicularly coupled to one end of each of the side walls, and each one of the ends of the side walls is substantially perpendicularly coupled to an other end of each of the side walls, thereby forming a rectangular shape.

10. The linear actuator of claim 7 wherein the magnetic permeable material comprises a low carbon steel.

11. The linear actuator of claim 8 wherein the voice coil actuator further comprises:

(a) two inner return path members; one end of each of the inner return path members coupled to the front member, and an other end of each of the inner return path members being coupled to the rear member; each one of the inner return path members passing through at least a portion of a coil coupled to the carriage assembly.

(b) a first magnet coupled to one of the side members; and, (c) a second magnet coupled to an other one of the side members.

12. A flex circuit for use in a linear actuator that has a carriage assembly, a voice coil actuator, read/write heads, and a central guide track; the flex circuit comprising one end electrically coupled to at least one of the read/write heads, an other end electrically coupled to a computer interface, a slot for passing the central guide track therethrough, and mass distributed substantially equally on each side of a vertical plane being coincident with a center axis of the central guide track.

13. The flex circuit of claim 12 wherein the flex circuit member comprises a flex circuit ribbon.

14. The flex circuit of claim 12 wherein the flex circuit comprises a plurality of leads within a substrate.

15. The flex circuit of claim 12 further comprising a plurality of head wires, at least one of said plurality of head wires having an end coupled to at least one of the read/write heads and an other end coupled to the flex circuit.

16. The flex circuit of claim 15 wherein the flex circuit member includes:

(a) a first planar member coupled to the carriage assembly, the first member oriented substantially vertically and having a normal vector approximately perpendicular to the center axis;

(b) a second planar member coupled to the carriage assembly and to the first member, the second member oriented substantially horizontally and having a normal vector approximately perpendicular to the center axis;

(c) a flexible, planar vertical member comprising:
 (i) a solid vertical end coupled to the second member, thereby defining a first radius; and,
 (ii) a forked vertical end comprising a first vertical furcation and a second vertical furcation, the first and second vertical furcations being spaced apart and defining a vertical portion of the slot therebetween, the vertical portion of the slot defining a vertical slot centerline, the vertical slot centerline bisecting the center axis and being substantially perpendicular therewith;

(d) a flexible, planar horizontal member comprising:
  (i) a forked horizontal end comprising:
    a first horizontal furcation coupled to the first vertical furcation, thereby forming a first furcation radius; and, a second horizontal furcation coupled to the second vertical furcation, thereby forming a second furcation radius; the first and second horizontal furcations being spaced apart and defining a horizontal portion of the slot therebetween, the horizontal portion of the slot defining a horizontal slot centerline, the horizontal slot centerline being substantially parallel and substantially co-planar with the center axis; and,
  (ii) a solid end including a transverse portion that is co-planar with the horizontal furcations, and defining a transverse centerline that is substantially co-planar and substantially perpendicular with the horizontal slot axis.

17. The flex circuit of claim 16 wherein said horizontal member is disposed beneath the carriage assembly and is oriented substantially horizontally while the carriage assembly is located in the retracted position.

* * * * *